United States Patent
Lannez et al.

(10) Patent No.: US 9,263,892 B2
(45) Date of Patent: Feb. 16, 2016

(54) METHOD AND A DEVICE FOR MANAGING ENERGY DISTRIBUTION

(71) Applicant: Alstom Technology Ltd., Baden (CH)

(72) Inventors: Sebastien Lannez, Paris (FR); Jean-Christophe Passelergue, Romans/Isere (FR)

(73) Assignee: Alstom Technology Ltd, Baden (CH)

( * ) Notice: Subject to any disclaimer, the term of this patent is extended or adjusted under 35 U.S.C. 154(b) by 275 days.

(21) Appl. No.: 13/789,432

(22) Filed: Mar. 7, 2013

(65) Prior Publication Data
US 2013/0238156 A1    Sep. 12, 2013

(30) Foreign Application Priority Data
Mar. 8, 2012    (FR) ...................................... 12 52113

(51) Int. Cl.
G05B 13/02    (2006.01)
H02J 3/14     (2006.01)
H02J 3/12     (2006.01)

(52) U.S. Cl.
CPC ... *H02J 3/14* (2013.01); *H02J 3/12* (2013.01); *Y02B 70/3225* (2013.01); *Y04S 20/222* (2013.01)

(58) Field of Classification Search
None
See application file for complete search history.

(56) References Cited

U.S. PATENT DOCUMENTS

| | | | |
|---|---|---|---|
| 2005/0228599 A1* | 10/2005 | Culp et al. | 702/62 |
| 2009/0307034 A1* | 12/2009 | Duff et al. | 705/7 |
| 2010/0063642 A1 | 3/2010 | Boss et al. | |
| 2010/0314942 A1* | 12/2010 | Talkin et al. | 307/41 |
| 2013/0054044 A1* | 2/2013 | Shaffer | H02J 3/14 700/297 |
| 2013/0110305 A1* | 5/2013 | Meyerhofer et al. | G06Q 50/06 700/296 |

OTHER PUBLICATIONS

French preliminary search report for French application No. 1252113, dated Dec. 4, 2012.

* cited by examiner

*Primary Examiner* — Sean Shechtman
(74) *Attorney, Agent, or Firm* — Nixon Peabody LLP

(57) ABSTRACT

A method of managing energy supply in which an aggregator receives an energy demand from at least one operator of an energy distribution network and sends instructions to a plurality of energy facilities suitable for providing energy in order to satisfy the demand, the method being characterized by the following steps:
  each energy facility transmits to the aggregator a description of instantaneous variations of the energy state and technical constraints linked to its operation in order to satisfy the demand; and
  the aggregator defines in automatic manner for each energy facility a response profile for the demand as a function of the description by taking into account non-linear responses and energy state history data from each energy facility, and transmits the response profile of the energy distribution network to the operator, and transmits a set of control signals to each energy facility in order to satisfy the demand.

9 Claims, 3 Drawing Sheets

METHOD AND A DEVICE FOR MANAGING ENERGY DISTRIBUTION

CROSS REFERENCE TO RELATED APPLICATIONS OR PRIORITY CLAIM

This application claims the benefit of French Patent Application No. 12 52113, filed Mar. 8, 2012, the contents of which are incorporated herein by reference in their entirety.

TECHNICAL FIELD

The invention is situated in the field of governing demand for energy and it relates more specifically to a method of managing energy supply to at least one operator of an energy distribution network, in which method an aggregator receives an energy demand from said operator and sends instructions to a plurality of energy facilities capable of modulating their energy consumption in order to satisfy said demand.

The invention also relates to a device designed to implement the method of the invention.

The invention further relates to a computer program recorded on a medium and including instructions for implementing the steps of the method according to the invention when it is executed by a computer.

The term "energy facility" refers to any object capable of consuming and/or producing and/or storing energy.

The term "aggregator" refers to a company or a public institution responsible for governing a group of energy facilities for responding to a demand for energy coming from one or more operators in the energy market. The energy facilities that are targeted by the aggregator's action may be the property of the aggregator or the property of the aggregator's clients.

Since the aggregator does not directly control all of the facilities, the aggregator must govern them by sending incentive signals thereto.

"Governing demand" means managing production, consumption, and storage of energy by a plurality of energy facilities distributed geographically over several sites or situated on sites belonging to private individuals who are clients of the aggregator.

STATE OF THE PRIOR ART

Transporting energy, in particular transporting electricity, between two physical points is limited by the capacity of the physical link used to that purpose. Also, when the operating limits of a physical link are reached, it is necessary either to increase its capacity, or to reduce energy consumption downstream.

One of the technical problems of governing demand is that the response of energy facilities to a signal is a priori not known and depends on the behavior of the facility or on the goodwill of the client owning the facility under consideration. By way of example, that happens when it is desired to reduce the energy consumption of a heating system by sending a command to that effect. In that event, in order to compensate for the expected reduction, a short time after the command has been received, energy consumption of the heating system becomes greater than expected.

In addition, energy distribution networks may encounter technical problems, such as for example, congestion on the transmission lines in the event of a strong electricity demand, departures of the frequency of the electricity supplied in a distribution network from the rated frequency, or even departures of the voltage supplied from the rated voltage.

The object of the invention is to enable an aggregator to act automatically and effectively to issue production and/or consumption and/or storage commands to the energy facilities that it governs so as to correct safety problems in an energy transport network as described above.

Another object of the invention is to enable the aggregator to automatically send power commands to the governed facilities in order to satisfy in optimum manner a pre-defined objective, that may consist, for example, in forestalling safety problems in an electric network; or even in maximizing the revenue created by managing the energy facilities governed by the aggregator by taking account, in particular, of the costs borne by the clients; the technical constraints linked to operating said facilities, in particular the minimum consumption of the facility; the maximum amount of energy that can be stored; or even the position of the facility in the distribution network.

SUMMARY OF THE INVENTION

The invention is implemented by an automatic method making it possible to disaggregate an energy demand, upwards or downwards, towards governed facilities.

Distribution is effective in the sense that it is performed while satisfying in optimum manner a predefined objective that may consist of correcting the above-described technical problems.

The aims of the invention are reached by means of an automatic method of managing energy supply in which an aggregator receives an upward or downward energy demand from at least one operator of an energy distribution network and sends instructions to a plurality of energy facilities suitable for providing or consuming the energy in order to satisfy said demand.

The method of the invention comprises the following steps:
on reception of the energy demand, the aggregator:
automatically constructs for each energy facility at least one response profile for said demand as a function, firstly, of a description of instantaneous variations of the energy state and technical constraints linked to the operation of each energy facility in order to satisfy said demand, and secondly, as a function of earlier variations of the energy state of each energy facility and of at least one earlier response profile previously defined for each energy facility; and
transmits the defined response profile to the operator, and transmits a set of control signals to each energy facility in order to satisfy said demand.

According to the invention, said set of control signals comprises at least an energy production command and/or an energy consumption command and/or an energy storage command.

Preferentially, the demand response profile is modeled by the aggregator by means of a finite set of continuous curves, each describing the energy state of the facility by taking into account the present energy demand being made on the facility, the energy available in each energy facility, and the time of said demand.

In a first application of the method of the invention, said energy facilities are power stations.

In a second application of the method of the invention, said energy facilities are wind turbines coupled to batteries.

In a third application of the method of the invention, said energy facilities are nuclear power stations.

In a fourth application of the method of the invention, said energy facilities comprise switchgear installed on sites belonging to consumers.

BRIEF DESCRIPTION OF THE DRAWINGS

Other characteristics and advantages of the invention appear from the description below, given by way of non-limiting example, with reference to the accompanying figures, in which.

DETAILED DESCRIPTION OF PARTICULAR EMBODIMENTS

Figure 1:
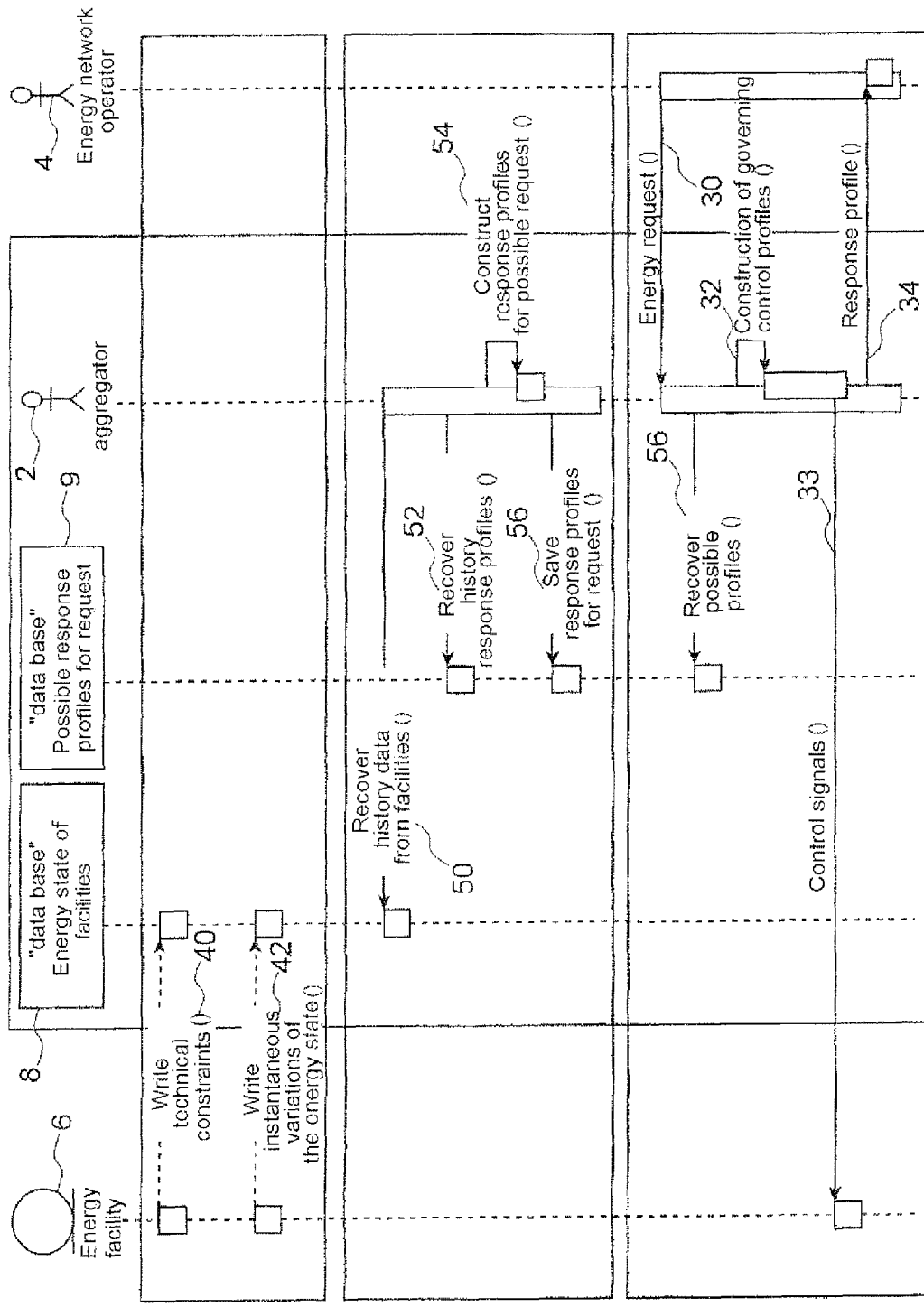
FIG. 1 shows the essential steps of the method of the invention.

The invention is described in the context of electricity networks comprising different sources of energy and having production and/or consumption and/or storage that can be controlled.

The method is implemented by a system for managing energy distribution and comprising: an aggregator 2 that is adapted to receive an energy demand from an operator 4; a plurality of energy facilities 6 suitable for supplying energy in order to satisfy said demand; a first data base 8 for storing energy states of each of said energy facilities 6; and a second data base 9 for storing, for each of said energy facilities, response profiles for the energy demands received by the aggregator 2.

The aggregator 2 comprises means for automatically constructing, for each energy facility 6, at least one response profile for said demand as a function, firstly, of a description of instantaneous variations of the energy state and technical constraints linked to the operation of each energy facility in order to satisfy said demand, and secondly, as a function of earlier variations of the energy state of each energy facility 6 stored in said first data base 8 and of earlier response profiles stored in the second data base 9 previously defined for said energy facility 6.

The aggregator 2 further includes means for transmitting the defined response profile to the operator 4, and for transmitting a set of control signals to each energy facility 6 in order to satisfy said demand.

In operation, as shown in FIG. 1, when an operator 4 transmits (step 30) an energy demand to the aggregator 2, said aggregator recovers possible response profiles for each facility 6 (step 31) from the data base 9 and constructs (step 32) for each energy facility 6 a governing control profile comprising at least an energy production command and/or an energy consumption command and/or an energy storage command.

In step 33 the aggregator 2 generates command signals as a function of the command profile constructed in step 32 and transmits said signals to each energy facility 6.

In step 34, the aggregator 2 informs the operator 4 of the expected response profiles.

At the same time, each energy facility 6 regularly transmits (step 40) information concerning its technical constraints to the data base 8, in order to respond to the energy demand received by the aggregator 2, and the instantaneous variations of its energy state (step 42); and in order to construct the response profiles for an energy demand, the aggregator 2 recovers (step 50) history data concerning the energy facilities 6 from the first data base 8, and previously-constructed (step 52) response profiles from the second data base 9, and constructs (step 54) in automatic manner for each energy facility 6 possible response profiles for said demand by taking recovered history information into account. The new constructed response profiles are then saved in the data base 9 (step 56).

Figure 2:
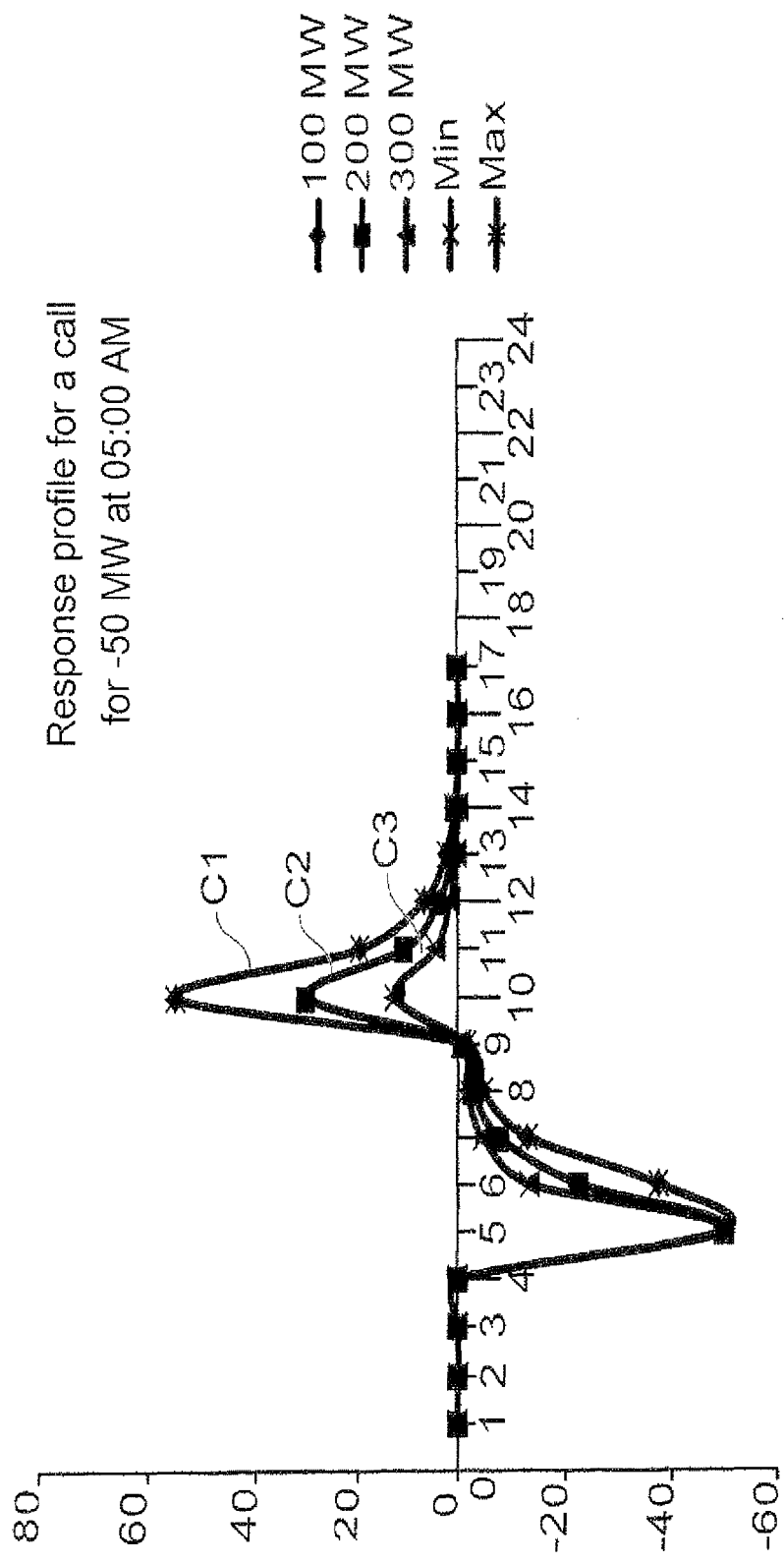
FIG. 2 shows an example of a response profile defined by the method of the invention.

FIG. 2 shows an example of response profile modeling for a client of the aggregator having a facility that may present consumption varying in the range 0 megawatts (MW) to 300 MW. This figure is constituted by three curves C1, C2, and C3 showing for each hour of the day the variation in consumption of energy facilities installed on a site belonging to the client of the aggregator 2 relative to expected consumption by taking into account a demand for a reduction in consumption at 05:00 AM. For the client, the curves are constructed on the assumption that the aggregator 2 has received a demand to reduce energy consumption by 50 MW, and that this demand will be entirely satisfied by the client. The three curves C1, C2, and C3 describe response profiles for said demand respectively for three possible operating modes of the energy facility. Curve C1 presents the variation in energy consumption by the energy facility in the event of a demand to reduce consumption by 50 MW at 05:00 AM when the expected consumption was 100 MW during the day. Curve C2 describes the variation in energy consumption by the energy facility for the same demand to reduce consumption when the expected consumption was 200 MW. Curve C3 describes the variation in energy consumption by the energy facility for the same demand to reduce consumption when the expected consumption was 300 MW. Curves C1, C2, and C3 describe an example of a response from a client trying to compensate for the reduction in consumption at 05:00 AM by an increase in the client's own consumption at about 10:00 AM.

Figure 3:
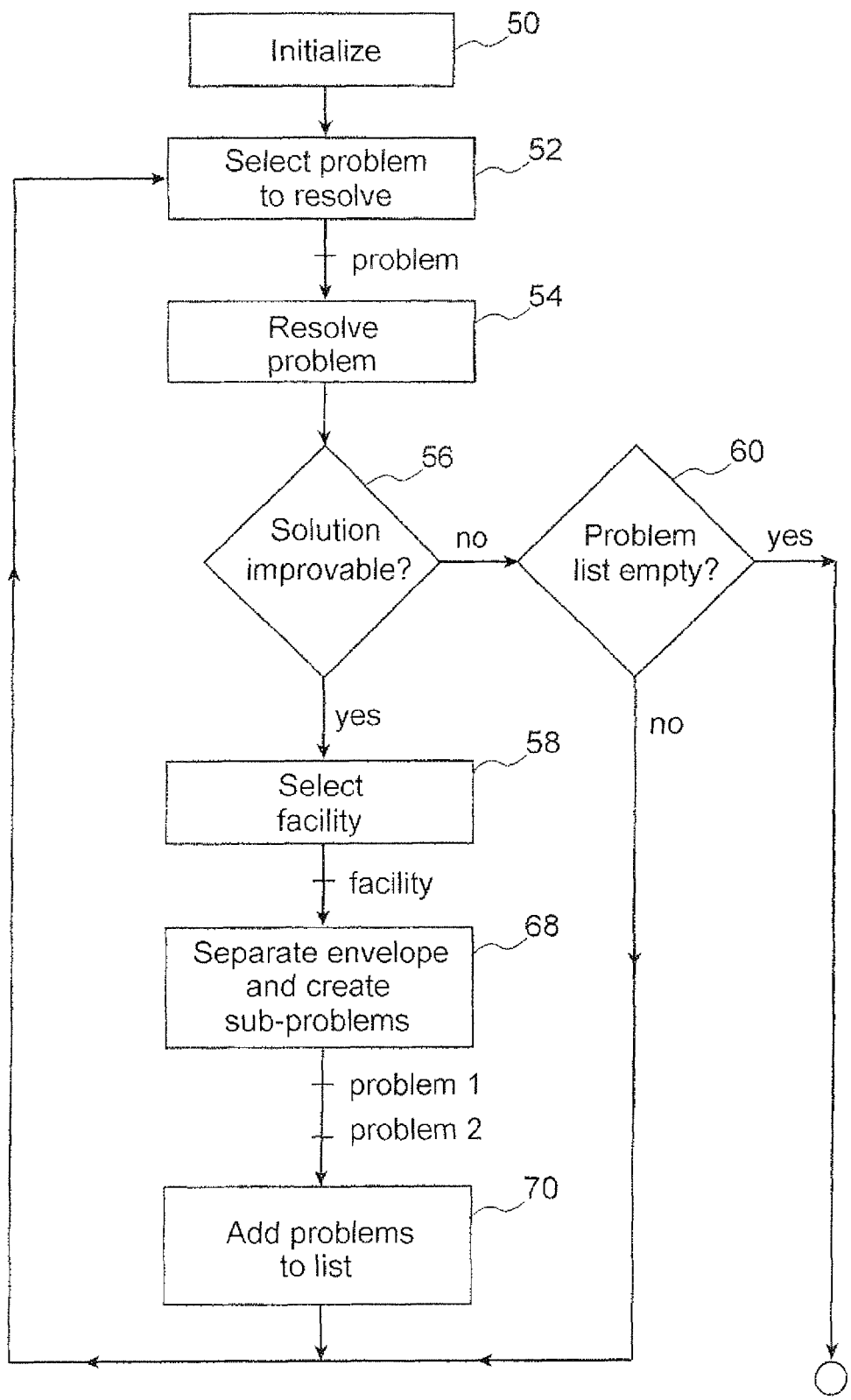
FIG. 3 is a flowchart showing the automatic determination of control profiles for controlling energy facilities.

FIG. 3 is a flowchart showing the automatic determination of control profiles generated in step 32.

Implementation of the method of the invention corresponds to minimizing a mathematical function making it possible to automatically determine control profiles for each energy facility under consideration as a function of the possible states of the systems. These states may for example represent the energy levels of facilities. By way of more detailed example, the "target" function may represent the amount of power transiting in a link of the energy distribution network that is greater than the transmission capacity of the link, as a function of consumption levels of certain energy facilities.

The principal of an optimum distribution of energy demands to the facilities targeted consists in creating realistic envelopes for response profiles and in improving said envelopes so as to converge on the optimum envelope.

To this end, a list of problems linked to operation of energy facilities is determined; the resolution of said problems is illustrated by the way the "target" function varies.

The flowchart of FIG. 3 shows the steps of the method of automatically determining the control profiles generated in step 32.

In step 50, a list of unresolved problems is created and initialized with an approximation of the problem of distributing energy demands.

In step 52, a problem is selected and removed from the list of unresolved sub-problems. In step 54, said problem is resolved by a mathematical programming algorithm and information concerning improvability of the solution is recovered after resolution.

In step 56 said information is used to test whether or not the solution can be improved. If it can, the method continues to step 58, if not, the algorithm of the method continues to step 60, and checks whether the list of unresolved problems is empty. If the list is empty, the method continues to step 52. In step 58 a facility having an approximate envelope that is not optimum is selected. In step 68 the envelope of said facility is separated into two, and two sub-problems are created. In step 70, said sub-problems are added to the list of unresolved sub-problems, and the method continues to step 52.

The invention claimed is:

1. A method of managing energy supply in which an aggregator receives an energy demand from at least one operator of an energy distribution network and sends instructions to a plurality of energy facilities driven by said aggregator and capable of producing and/or storing energy in order to satisfy said demand, the method being characterized by the following steps:

each energy facility transmits to the aggregator a description of instantaneous variations of the energy state and technical constraints linked to its operation in order to satisfy said demand; and the aggregator automatically defines for each energy facility a response profile for the demand as a function of said description by taking into account non-linear responses and energy state history data from each energy facility and by using a finite set of continuous curves, each describing the energy state of each energy facility, a present energy demand, the energy available in each energy facility, and the time of said demand from the operator and transmits said response profile to the operator of the energy distribution network, and transmits a set of control signals to each energy facility in order to satisfy said demand from the operator.

2. A method according to claim 1, wherein said set of control signals comprises at least an energy production command and/or an energy consumption command and/or an energy storage command.

3. A method according to claim 1, wherein the demand response profile is modeled by the aggregator by means of a finite set of continuous curves, each describing the energy state of each energy facility by taking into account the present energy demand, the energy available in each energy facility, and the time of said demand.

4. A method according to claim 3, wherein said energy facilities are power stations.

5. A method according to claim 3, wherein said energy facilities are wind turbines.

6. A method according to claim 3, wherein said energy facilities are nuclear power stations.

7. A method according to claim 3, wherein said energy facilities comprise switchgear installed on sites belonging to consumers.

8. A computer program recorded on a non-transitory medium and including instructions for implementing the steps of the method according to claim 1 when it is executed by a computer.

9. A device for managing distribution of energy to at least one energy operator of an energy distribution network comprising, an aggregator having means for receiving an energy demand and means for governing a system of a plurality of energy facilities suitable for providing energy in order to satisfy said demand, the system being characterized in that each energy facility is adapted to transmit to the aggregator a description of instantaneous variations of the energy state and technical constraints linked to its operation in order to satisfy said demand, and in that the aggregator defines in automatic manner for each energy facility a response profile for each demand as a function of said description by taking into account non-linear responses and energy state history data from each energy facility and by using a finite set of continuous curves, each describing the energy state of each energy facility, a present energy demand, the energy available in each energy facility, and the time of said demand from the operator, and transmits said response profile to the operator of the energy distribution network, and transmits a set of control signals to each energy facility in order to satisfy said demand from the operator.

* * * * *